US009457762B2

(12) United States Patent
Jayasuriya et al.

(10) Patent No.: US 9,457,762 B2
(45) Date of Patent: Oct. 4, 2016

(54) ACTIVE HOOD FRONT COVER FOR PEDESTRIAN PROTECTION

(71) Applicant: Ford Global Technologies, LLC, Dearborn, MI (US)

(72) Inventors: Mangala A. Jayasuriya, Bloomfield Hills, MI (US); Brian Robert Spahn, Plymouth, MI (US); Richard Edward Ruthinowski, Taylor, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 14/460,755

(22) Filed: Aug. 15, 2014

(65) Prior Publication Data
US 2016/0046259 A1    Feb. 18, 2016

(51) Int. Cl.
| | |
|---|---|
| *B60K 28/10* | (2006.01) |
| *B60R 21/36* | (2011.01) |
| *B60R 21/013* | (2006.01) |
| *B62D 25/12* | (2006.01) |
| *B60R 21/0134* | (2006.01) |
| *B60R 21/0136* | (2006.01) |
| *B60R 21/38* | (2011.01) |
| *B60R 21/00* | (2006.01) |
| *B60R 21/01* | (2006.01) |

(52) U.S. Cl.
CPC ............ *B60R 21/36* (2013.01); *B60R 21/013* (2013.01); *B60R 21/0134* (2013.01); *B60R 21/0136* (2013.01); *B60R 21/38* (2013.01); *B62D 25/12* (2013.01); *B60R 2021/0004* (2013.01); *B60R 2021/01252* (2013.01)

(58) Field of Classification Search
USPC ................................. 280/749, 751; 180/274
See application file for complete search history.

(56) References Cited

U.S. PATENT DOCUMENTS

| | | | |
|---|---|---|---|
| 6,237,992 B1 | 5/2001 | Howard | |
| 6,415,863 B1 | 7/2002 | Myrholt et al. | |
| 6,857,495 B2 | 2/2005 | Sawa | |
| 7,571,955 B2 | 8/2009 | Nagae et al. | |
| 7,836,996 B2 * | 11/2010 | Kitte et al. | 180/271 |
| 7,997,375 B2 | 8/2011 | Shaw | |
| 8,016,066 B1 * | 9/2011 | Boxey | 180/271 |
| 9,016,425 B1 * | 4/2015 | Choi | 180/274 |
| 2004/0074690 A1 * | 4/2004 | Sato et al. | 180/274 |
| 2004/0262893 A1 * | 12/2004 | Kempf et al. | 280/730.1 |
| 2005/0269805 A1 * | 12/2005 | Kalliske et al. | 280/730.1 |
| 2009/0145681 A1 * | 6/2009 | Hayashi et al. | 180/274 |
| 2010/0307854 A1 * | 12/2010 | Mildner | 180/274 |
| 2014/0291055 A1 * | 10/2014 | Tanaka et al. | 180/274 |

* cited by examiner

*Primary Examiner* — Toan To
(74) *Attorney, Agent, or Firm* — LeClairRyan

(57) ABSTRACT

A hood front cover assembly usable on a vehicle in which the hood has a leading edge and an underside adjacent the leading edge to reduce pedestrian injury in a pedestrian-vehicle impact event is disclosed. The cover assembly includes a deployable cover and cover housing. The housing is located on the underside of the hood adjacent the leading edge. The cover is movable between a stowed position and a deployed position. The cover may be entirely rigid or may be partially deformable and may include a hollow flexible front portion. A mechanism is provided for moving the cover between the stowed and deployed positions. The mechanism is associated with the housing and may be driven by a spring driver, a motor or a pneumatic driver. A pedestrian impact sensor is provided in the front end of the vehicle. The sensor is operatively associated with the hood front cover assembly.

17 Claims, 10 Drawing Sheets

ACTIVE HOOD FRONT COVER FOR PEDESTRIAN PROTECTION

TECHNICAL FIELD

The disclosed inventive concept relates generally to pedestrian protection systems for automotive vehicles. More particularly, the disclosed inventive concept relates to a pedestrian protection system that includes a deployable engine hood front cover that is movable between a stowed position and a deployed position in the event of an impact with a pedestrian, or may be pre-deployed to an extended position prior to vehicle-to-pedestrian impact as a result of pre-impact detection.

BACKGROUND OF THE INVENTION

Pedestrian-vehicle impact events are unfortunate but known occurrences. It is estimated that for vehicle-to-pedestrian collisions, eighty percent of serious injuries occurred to the pedestrian's head while thirty-seven percent of moderate injuries were suffered by lower extremities. (*BMJ.* May 22 2002: 324 [7346]: 11 45-1148)

The front edge of the vehicle hood is typically a relatively stiff area that impacts an adult's upper leg during a pedestrian-vehicle impact event. In a pedestrian-vehicle impact event involving a small child, the child's head may also collide with the front edge of the vehicle's hood.

The vehicle front and specifically the front overhang are designed to identify vehicle class and model type. In the case of the modern sports car, the front end is typically designed such that the vehicle has an overall low profile and a large hood to accommodate a high-power engine and associated powertrain. The front overhang of regular sedans and sports utility vehicles are designed to be stiff enough so that the damage to the front end during a low speed crash is not substantial. Larger vehicles, such as trucks, are often designed to enhance the sizes of the vehicle's grille and engine compartment, thus exaggerating the appearance of power and toughness. Such design characteristics can increase challenges associated with pedestrian impact protection.

The kinematics of a pedestrian during an impact depend on the characteristics of the vehicle front, its speed and the size of the pedestrian. If the center of gravity of a standing or walking pedestrian is higher than the leading edge of the vehicle, then the pedestrian's body may at least partially wrap around the vehicle front or may be lifted into the air as a result of vehicle contact. In general, the center of gravity of the pedestrian is most commonly higher than the leading edge of the vehicle, while the lifting of a pedestrian most commonly occurs during a high speed impact.

In the circumstance where an adult pedestrian at least partially wraps around the vehicle front it is the pedestrian's upper leg that is often impacted by the edge of the hood causing injury to the upper leg. If the impact event involves a child then the child's head or other body parts could impact the forward edge of the hood causing serious injury.

Known tests, such as the EuroNCAP pedestrian protection test protocol, include measures to protect the upper leg from impacting the hood (or bonnet) leading edge ("BLE"). The challenge in this test is that the impact velocity, angle as well as impact kinetic energy and legform mass are determined by look-up diagrams in the test protocol. Employed standards are based on the bonnet leading edge height ("BLEH") and the bumper lead ("BL") of the target vehicle at the impact location. The styling of a vehicle is determined at an early stage of a vehicle program which can result in a high initial kinetic energy ("KE") level in the upper legform test.

To absorb legform KE by the front of the vehicle, there should be sufficient energy absorbing ("EA") space. However, the stiffness requirements of the front structure and the components packaged at the front may not give sufficient EA space. This brings greater challenges to meeting upper legform requirements. Moreover a slight change in the final design in a local impact location can change the BLEH and the BL at that location and thus may lead to additional and costly late stage countermeasures to meet upper legform test requirements.

A known countermeasure to meet known pedestrian protection requirements is to incorporate a deployable hood into the vehicle. However, while providing arguable improvements in the current state of the art, some deployable hood designs could benefit from further enhancement of pedestrian protection at the front of the vehicle.

Accordingly, there is a need for a practical and effective system to protect pedestrians in a pedestrian-vehicle impact event. As in so many areas of vehicle technology there is always room for improvement related to the protection of pedestrians in a pedestrian-vehicle impact event.

SUMMARY OF THE INVENTION

The disclosed inventive concept provides a solution to reduce the injury to adult pedestrian upper leg and child pedestrian head when impacted at or near the front end of the hood during collision. Particularly, the disclosed inventive concept provides a hood front cover assembly usable on a motor vehicle having a hood where the hood has a leading edge and an underside adjacent the leading edge.

The hood front cover assembly includes a deployable cover and a cover housing. The housing is attached to the underside of the hood adjacent the leading edge of the hood. The cover is movable between a stowed position and a deployed position relative to the housing.

The cover may be entirely rigid or at least partially deformable and may further include a flexible and expandable hollow front portion.

A mechanism is provided for moving the cover between the stowed position and the deployed position. The mechanism is associated with the housing and may be driven by mechanisms including a spring, a motor, or a pneumatic driver, pyrotechnic or gas-generating device.

One or more sensors are provided in association with the front end of the vehicle that senses a pedestrian impact. Such sensing is operatively associated with the hood front cover assembly.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
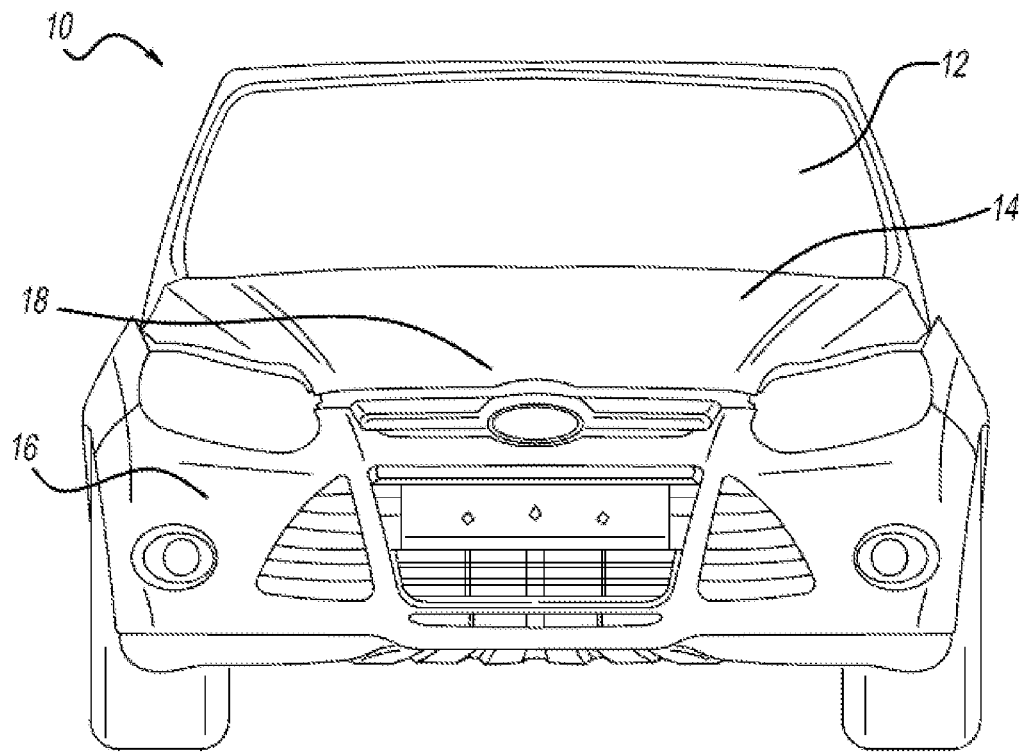
FIG. 1 is a front view of a vehicle having the deployable hood front cover for pedestrian protection according to the disclosed inventive concept showing the vehicle hood in its lifted condition.

In the following figures, the same reference numerals will be used to refer to the same components. In the following description, various operating parameters and components are described for different constructed embodiments. These specific parameters and components are included as examples and are not meant to be limiting.

In general, the disclosed invention provides an enhanced pedestrian injury mitigation system for a vehicle compared with known technologies through the provision of an active hood front cover assembly usable on a motor vehicle.

Referring to FIG. 1, a front view of a motor vehicle having an active hood front cover for pedestrian protection according to the disclosed inventive concept is illustrated and is generally shown as 10. The motor vehicle 10 includes a windshield 12, an engine hood 14 forward of the windshield 12, and a front fascia 16 forward of the engine hood 14. The engine hood 14 includes a leading edge 18. The engine hood 14 is in its un-lifted or resting condition.

It is to be understood that the configuration of the motor vehicle shown 10 shown in FIG. 1 is only suggestive and is not intended as limiting. Indeed, the disclosed inventive concept can have application to any motor vehicle having an engine hood, including, but not limited to, passenger vehicles, sport utility vehicles, trucks, and recreational vehicles.

Figure 2:
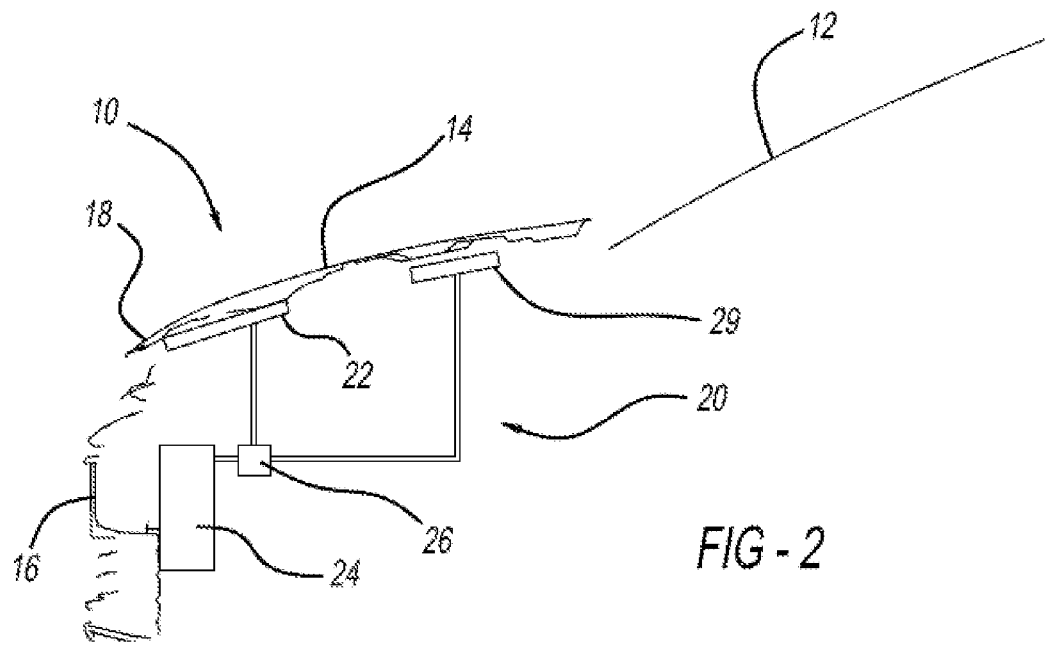
FIG. 2 is a sectional side view of the vehicle shown in FIG. 1 diagrammatically illustrating the primary components of the deployable hood front cover of the disclosed inventive concept, also showing the hood in its un-lifted condition.

Referring to FIG. 2, a sectional side view of the motor vehicle 10 is illustrated. Again, the engine hood 14 is in its un-lifted or resting condition. An active hood front cover module 20 is generally illustrated. The active hood front cover module 20 includes a deployable hood front cover assembly 22 attached to the underside of the engine hood 14 adjacent the leading edge 18, a pedestrian impact or pre-impact sensor 24, and a control unit 26. The control unit 26 is operatively associated with a hood lifter system 29.

Figure 3:
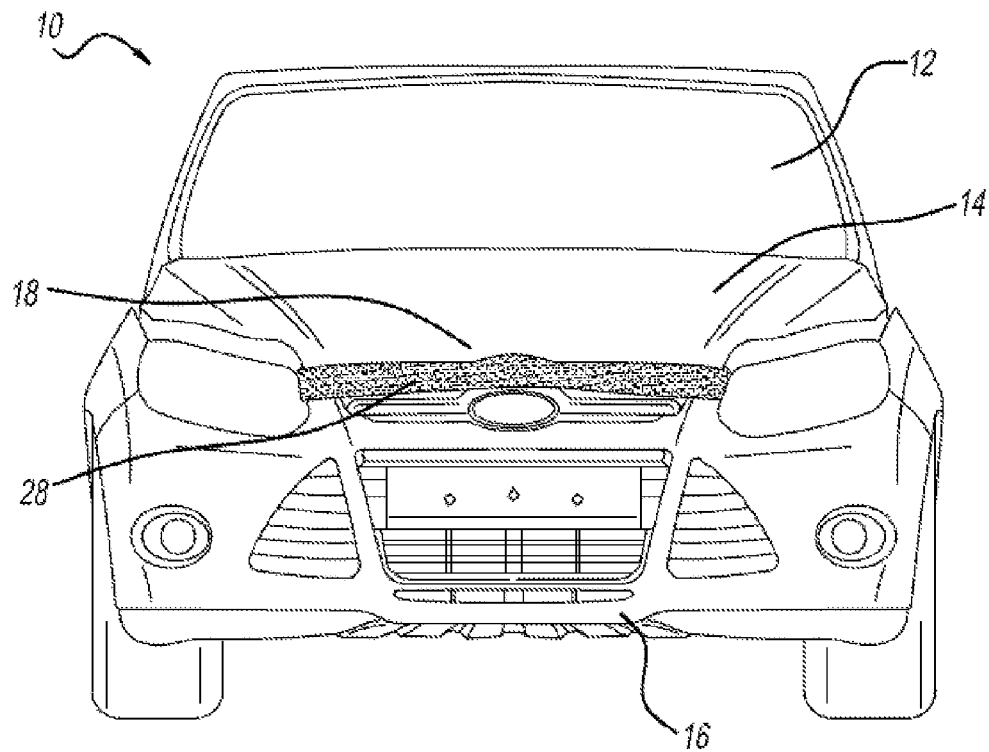
FIG. 3 is a view similar to that of FIG. 1 but showing the engine hood in its lifted condition and the deployable hood front cover of the disclosed inventive concept in its extended position relative to the vehicle hood.
Figure 4:
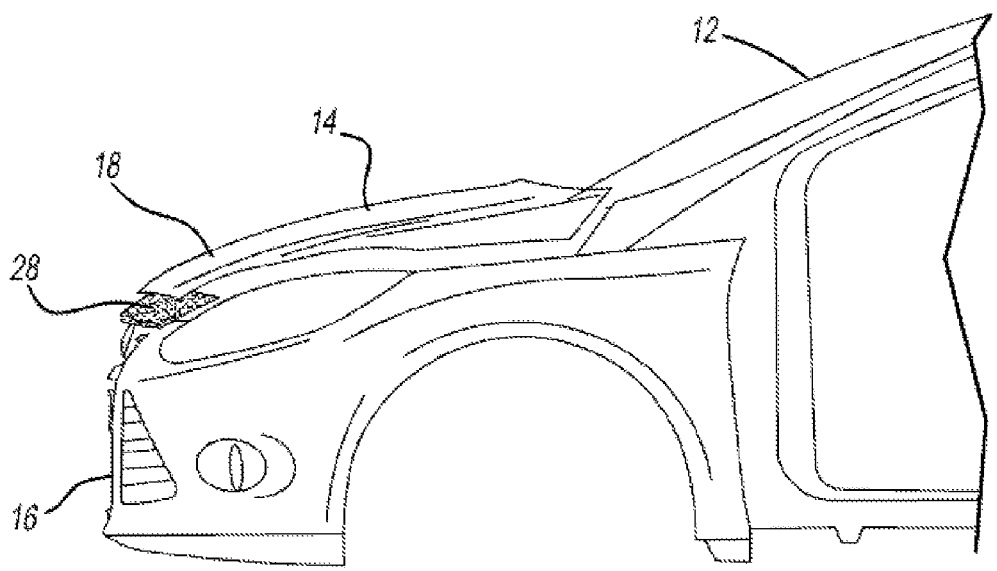
FIG. 4 is a side view of the vehicle having the deployable hood front cover for pedestrian protection showing the deployable hood front cover in an extended position relative to the vehicle hood.

In the event that the pedestrian impact sensor 24 predicts or senses the impact of a pedestrian upon the fascia 16, a signal is sent to the control unit 26 which, in turn, sends signals to the active hood front cover assembly 20 and to the hood lifter system 29. Upon receipt of the signal, the hood lifter system 29 causes the engine hood 14 to be moved to its lifted condition as illustrated in FIGS. 3 and 4 while further triggering an active hood front cover 28 to extend vehicle forward from the active hood front cover module 20, thereby providing engagement with a deformable member by the pedestrian's leg or other body parts in the event of a vehicle impact. With respect to FIG. 3, while not illustrated, a hood front cover 28 may span a greater cross-car distance than that shown between the headlights of the vehicle 10 in actual implementation.

Figure 5:
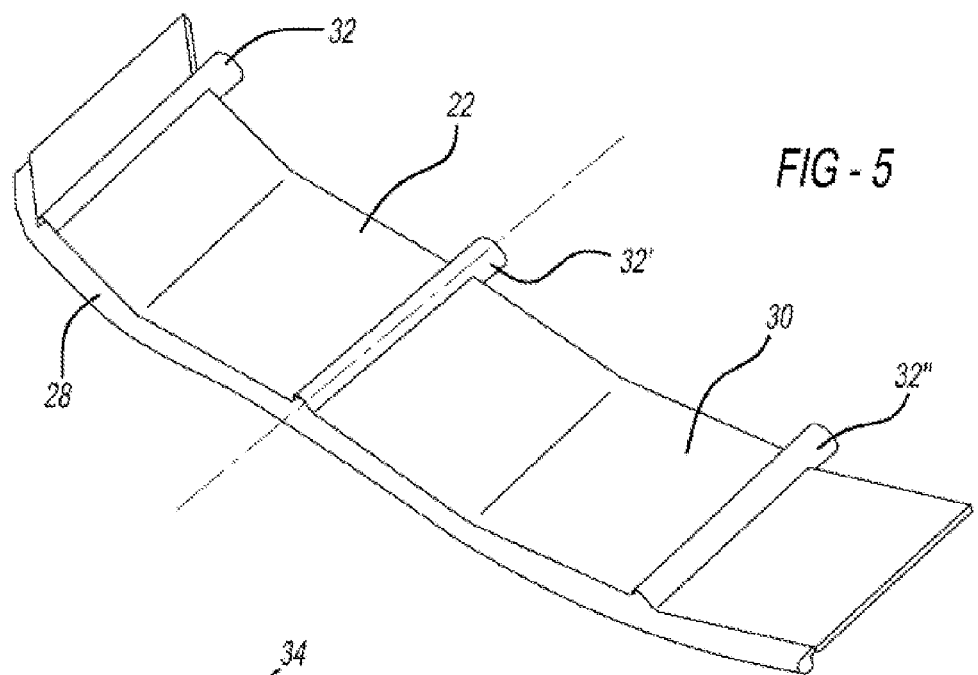
FIG. 5 is a perspective view of the deployable hood front cover assembly of the disclosed inventive concept viewed generally from the top.
Figure 6:
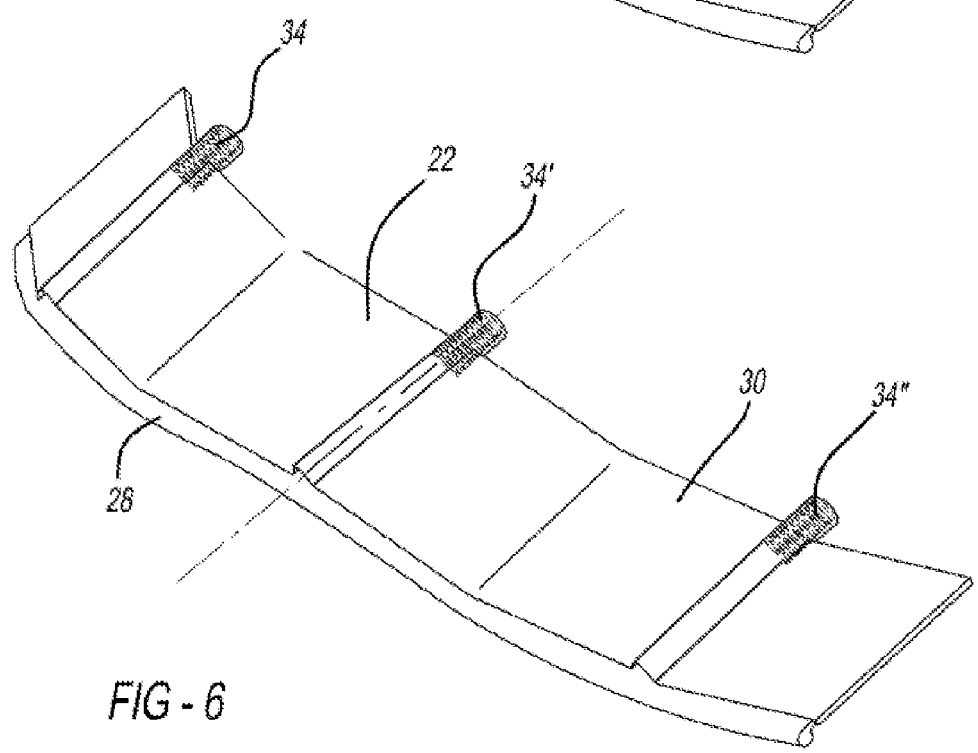
FIG. 6 is a view of the active hood front cover assembly similar to that of FIG. 5 but showing, in partial section, deployment springs in their compressed states.

Perspective views of the deployable hood front cover assembly 22 of the disclosed inventive concept are illustrated in FIGS. 5 and 6 in its stowed condition. The deployable hood front cover assembly 22 includes the active hood front cover 28 ordinarily stowed within a hood front cover housing 30. A plurality of spring housings 32, 32' and 32" enclose a like number of springs 34, 34' and 34", illustrated in their compressed states in FIG. 6. It is to be understood that while three spring housings 32, 32' and 32" and three coil springs 34, 34' and 34" are illustrated, a greater or lesser number of housings and springs may be employed. In addition, while coil springs are shown, other types of springs may be used instead of or in addition to the illustrated coil springs.

The geometry and the length of the active hood front cover 28 are designed such that the adult pedestrian upper leg or child pedestrian upper body will contact the active hood front cover 28 prior to impacting the leading edge 18 of the engine hood 14. The selected material and thickness of the active hood front cover 28 collectively provide engineered energy absorption characteristics, generally deforming similar to the fascia 16, reducing the rate of displacement of the pedestrian upper leg or child upper body before contacting the leading edge 18 of the engine hood 14.

Figure 7:
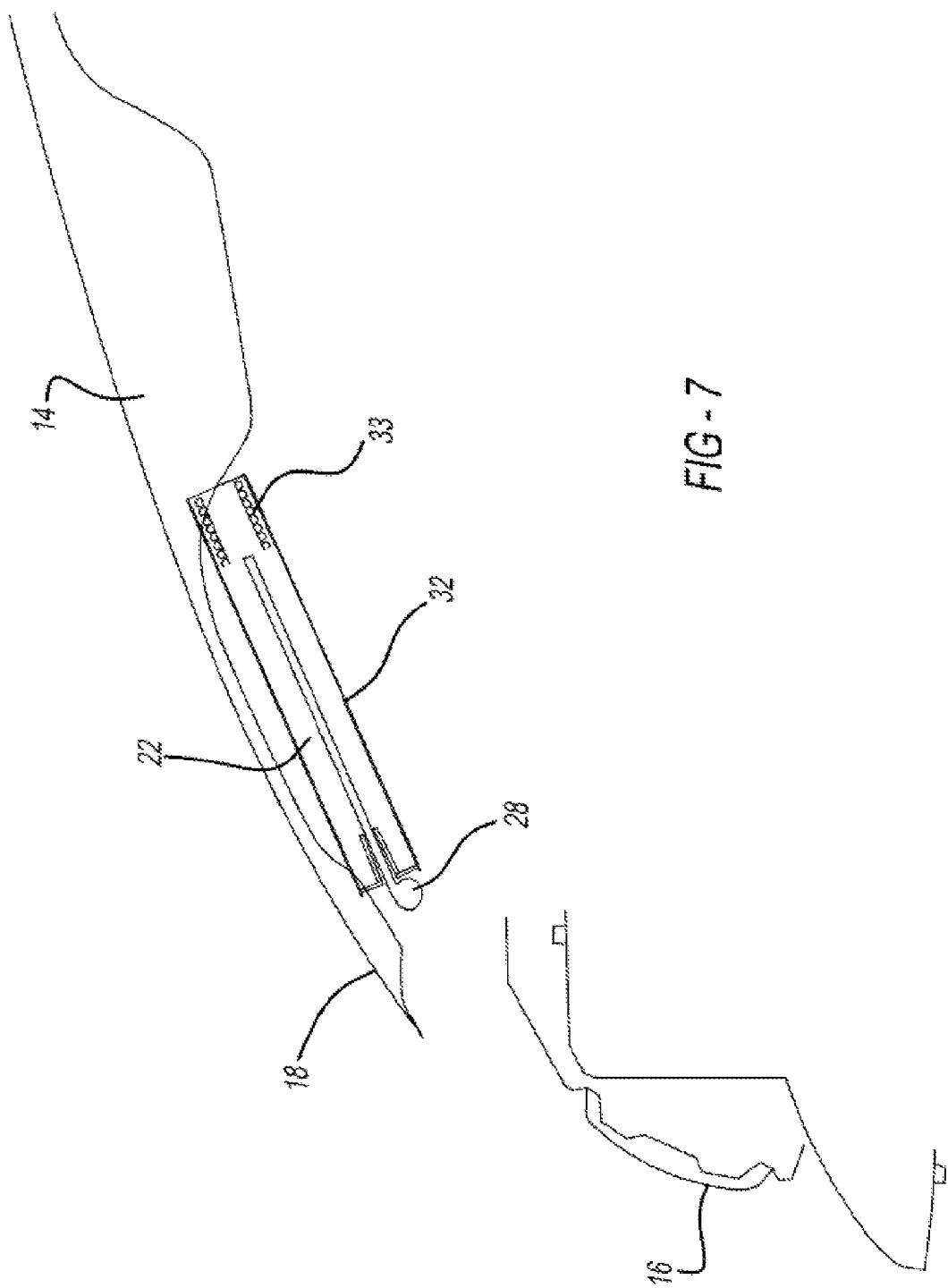
FIG. 7 is a close-up sectional side view illustrating the deployable hood front cover assembly with the vehicle engine hood in its lifted condition and the hood front cover in its housed condition within the hood front cover housing according to a spring-loaded embodiment of the disclosed inventive concept.

A sectional side view of the deployable hood front cover assembly 22 is illustrated in FIG. 7 in which the engine hood has been raised for deployment of the active hood front cover 28, which has not yet been deployed. A spring 33 is shown in its compressed, pre-deployed condition. When the engine hood 18 is raised to allow for deployment of the active hood front cover 28, the leading edge 18 of the engine hood 14 is lifted far enough from the top of the fascia 16 (as illustrated) to allow for clear passage of the deploying active hood front cover 28. For example, in the case of imminent pedestrian impact, the engine hood 14 may be lifted 25-30 mm at the leading edge 18.

Figure 8:
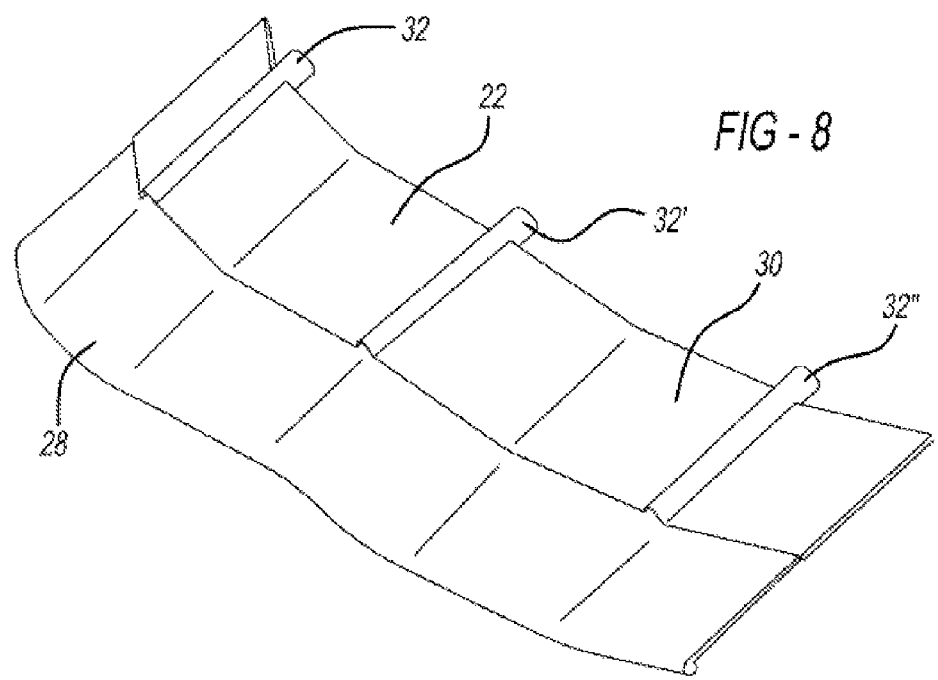
FIG. 8 is a view of the deployable hood front cover assembly similar to that of FIG. 5 but showing the hood front cover in its deployed condition.
Figure 9:
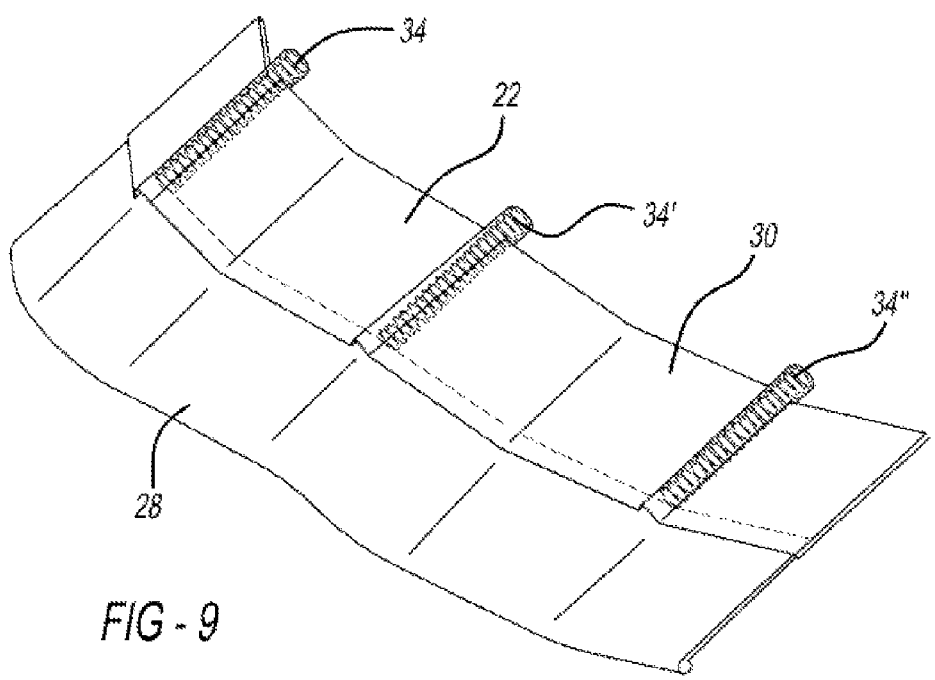
FIG. 9 is a view of the deployable hood front cover assembly similar to that of FIG. 8 but showing, in partial section, the springs in their extended states.
Figure 10:
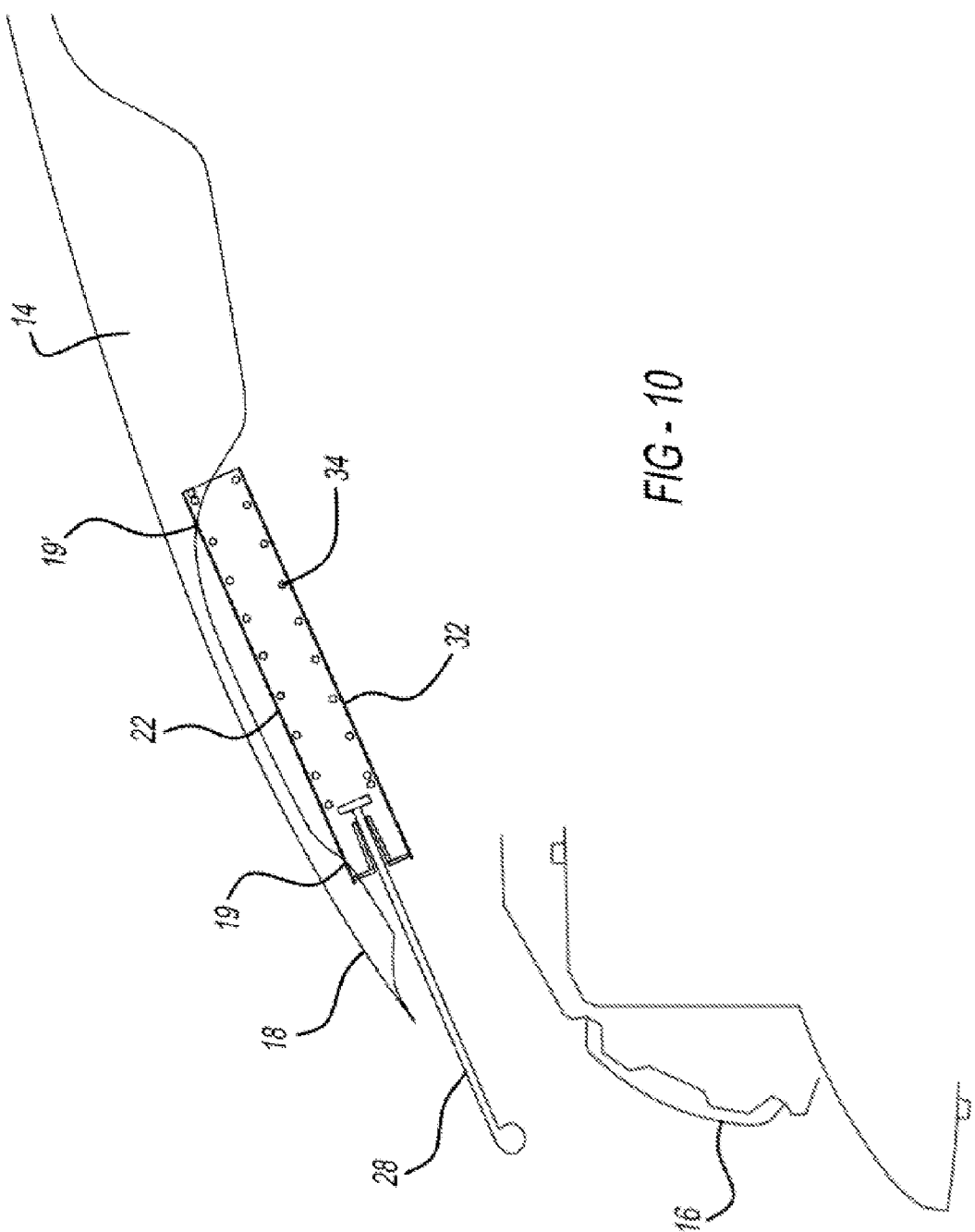
FIG. 10 is a close-up sectional side view illustrating the deployable hood front cover assembly shown in FIG. 7 with the vehicle engine hood in its lifted condition and the hood front cover in its deployed condition according to the spring-loaded embodiment of the disclosed inventive concept.

FIGS. 8 and 9 illustrate perspective views of the active hood front cover 28 in an extended position relative to the hood front cover housing 30. Deployment of the active hood front cover 28 is the result of the springs 34, 34' and 34" being released from their compressed positions. As shown in FIG. 10, the active hood front cover 28 extends such that a substantial portion overlaps the upper portion of the fascia 16. To provide additional or alternative energy absorption associated with a pedestrian impacting a hood front cover 28, the interlace 19 and 19' between housing 30 and the underside of the hood 14 may be configured to deform in a controlled manner. This would be additionally beneficial in the case of a relatively rigid hood front cover 28, providing a means for controlling displacement of the pedestrian in contact with the hood front cover 28.

The active hood front cover 28 is pushed into the hood front cover housing 30 against the coil springs 34, 34' and 34". The active hood front cover 28 is held in this stowed position by one or more locks (not shown). The locks remain engaged and ready to release the active hood front cover 28 if the engine hood 14 is lifted without manually unlocking the hood latch (not shown).

During the manual unlocking of the hood latch, locks holding the active hood front cover 28 in its stowed position will remain engaged and will not deploy the active hood front cover 28 when the engine hood 14 is raised to access the engine compartment. In the event of either a predicted or actual pedestrian impact, the engine hood 14 is lifted by the deployable hood technology and the locking mechanism that restrains the active hood front cover 28 in a stowed position is released to permit extension of the hood front cover 28 from the housing 30.

Figure 11:
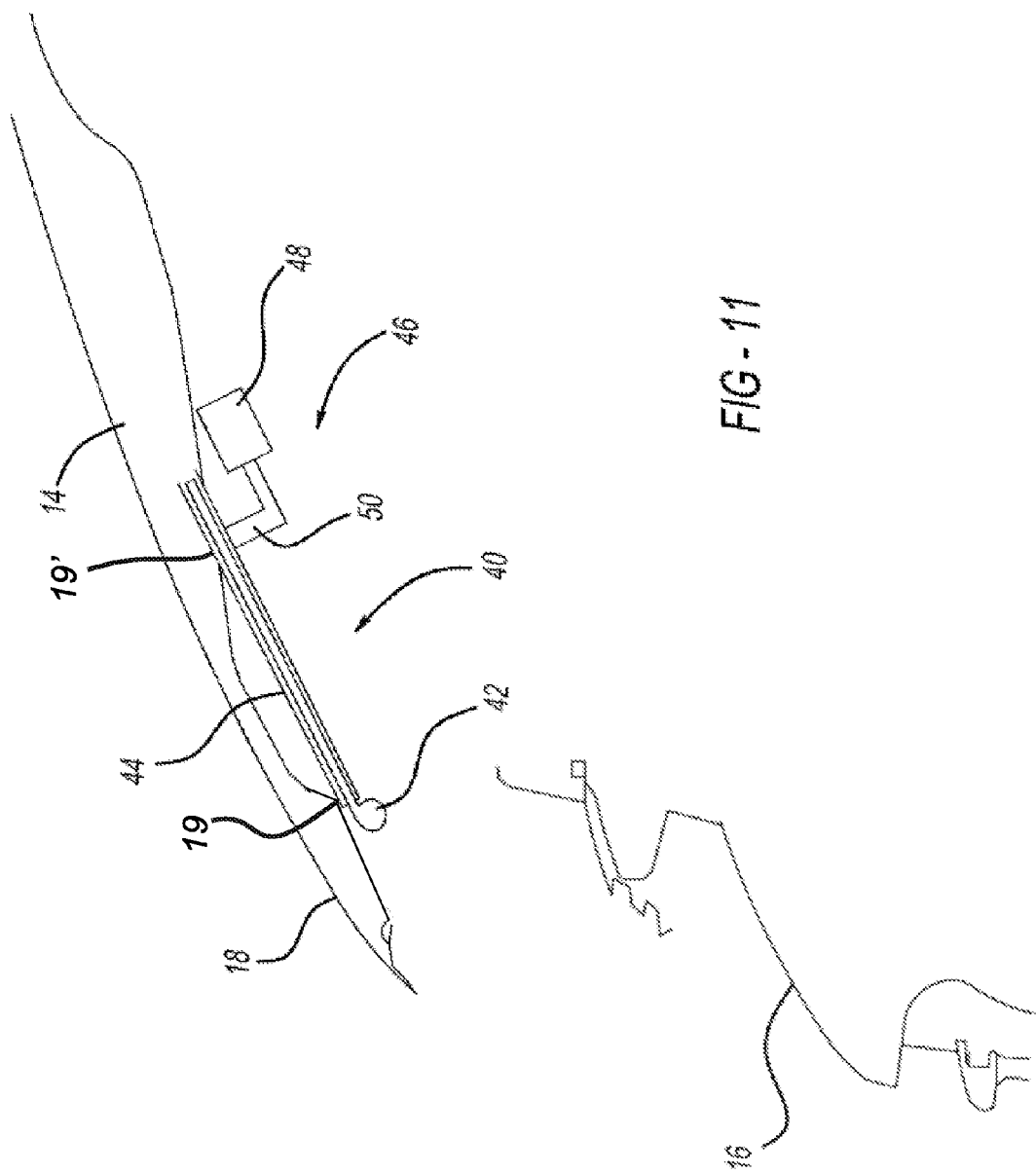
FIG. 11 is a close-up sectional side view illustrating the deployable hood front cover assembly with the vehicle engine hood in its lifted condition and the hood front cover in its housed condition within the hood front cover housing according to a pneumatic-driven embodiment of the disclosed inventive concept.
Figure 12:
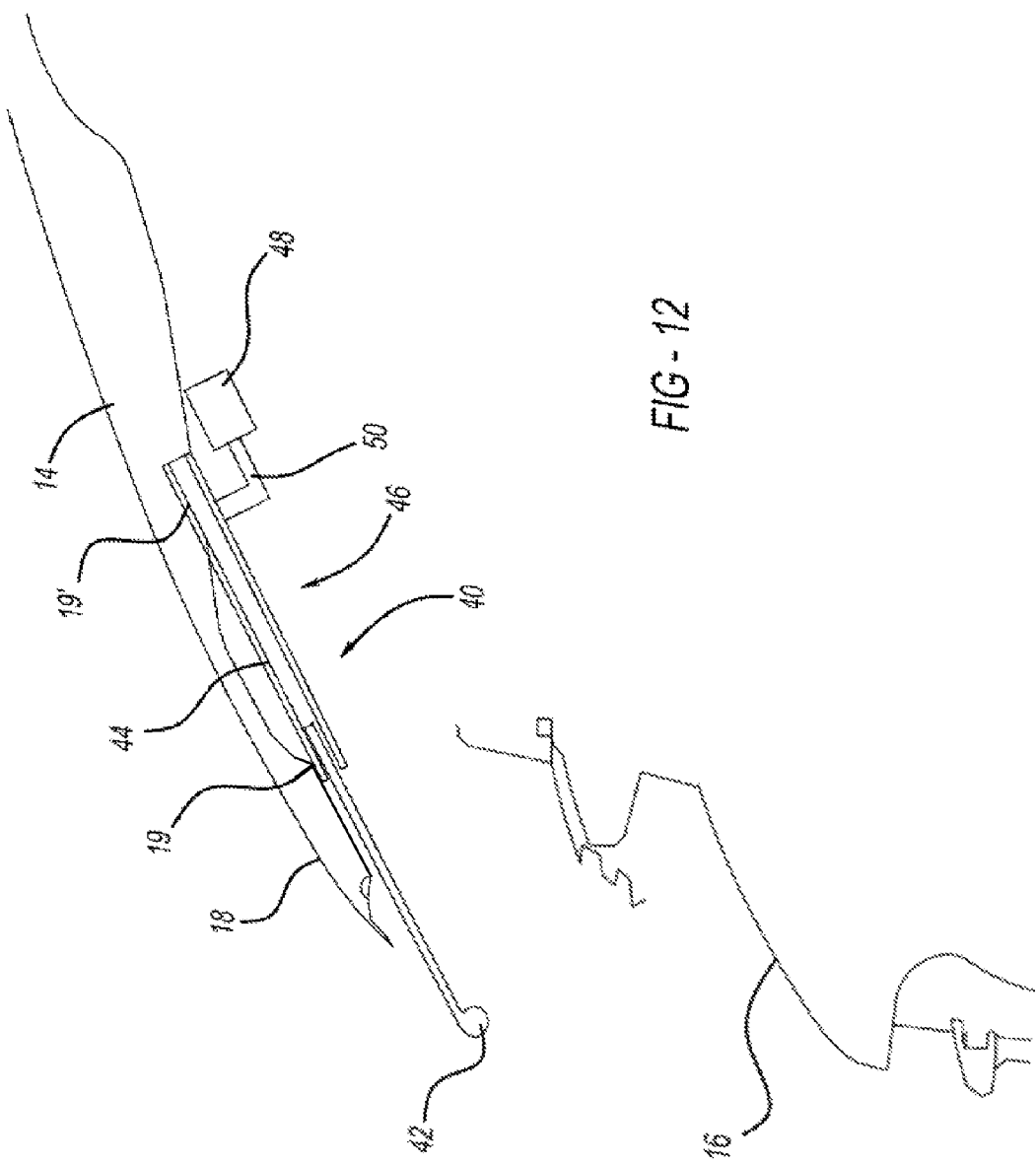
FIG. 12 is a close-up sectional side view illustrating the deployable hood front cover assembly shown in FIG. 11 with the vehicle engine hood in its lifted condition and the hood front cover in its deployed condition according to the pneumatic-driven embodiment of the disclosed inventive concept.

While a spring-driven embodiment of the disclosed inventive concept has been discussed and illustrated, it is to be understood that other methods of activating deployment of the active hood front cover 28 relative to the hood front cover housing 30 are possible. FIGS. 11 and 12 illustrate an alternate embodiment of an active hood front cover assembly, generally illustrated as 40. The active hood front cover assembly 40 includes an active hood front cover 42 housed within a hood front cover housing 44.

A pneumatic driver system, generally illustrated as 46, is operatively associated with the active hood front cover 42. The pneumatic driver system 46 includes a pneumatic pump 48 and an associated fluid conduit 50.

In addition to the pneumatic driver system 46, other drivers may be employed. Non-limiting examples of such drivers include electromagnetic systems and pyrotechnical devices.

FIG. 11 illustrates the active hood front cover 42 in its stowed position relative to the hood front cover housing 44.

Upon impact with a pedestrian, the active hood front cover 42 is deployed, driven outwardly to a deployed position relative to the hood front cover housing 44 as illustrated in FIG. 12 by operation of the pneumatic pump 48 of the pneumatic driver system 46. To provide additional or alternative energy absorption associated with a pedestrian impacting the hood front cover 42, the interface 19 and 19' between the housing 44 and the underside of the hood 14 may be configured to deform in a controlled manner. This would be additionally beneficial in the case of a relatively rigid hood front cover 42, providing a means for controlling displacement of the pedestrian in contact with the hood front cover 42.

Figure 13:
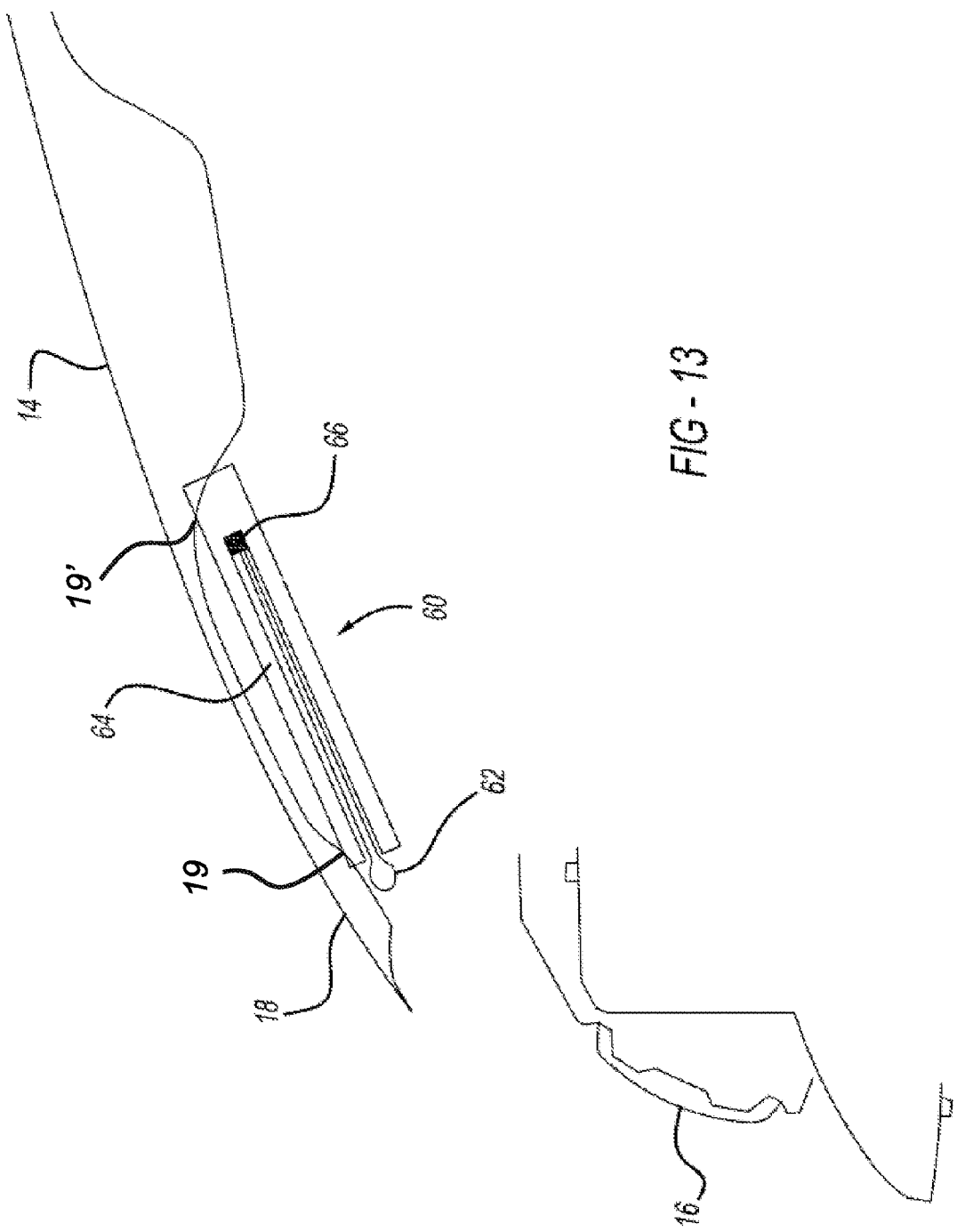
FIG. 13 is a close-up sectional side view illustrating the deployable hood front cover assembly with the vehicle engine hood in its lifted condition and the hood front cover in its housed condition within the hood front cover housing according to an embodiment of the disclosed inventive concept that incorporates a flexible hood front cover.
Figure 14:
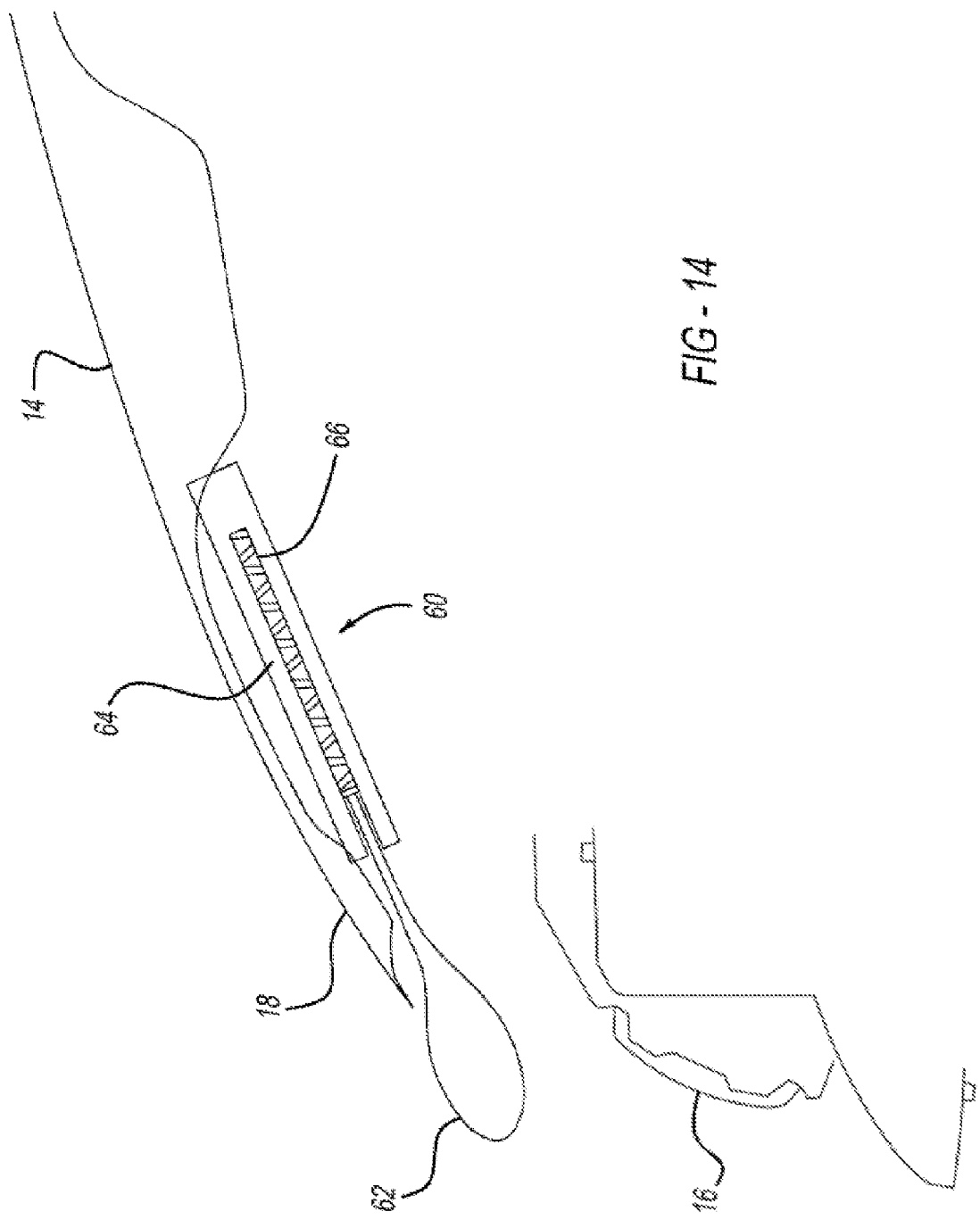
FIG. 14 is a close-up sectional side view illustrating the deployable hood front cover assembly shown in FIG. 13 with the vehicle engine hood in its lifted condition and the hood front cover in its deployed condition according to the embodiment of the disclosed inventive concept that incorporates an expanding hood front cover.

Beyond providing an alternative method of deploying the active hood front cover, the disclosed inventive concept also provides an alternative construction for the active hood front cover itself. Particularly, the active hood front cover may have geometries other than that which has been previously discussed, such as generally illustrated in FIGS. 13 and 14. A deployable hood front cover assembly 60 is provided including an expandable, pouch-shaped active hood front cover 62 that is ordinarily stowed in a compressed and retracted state within a hood front cover housing 64. The deployable hood front cover assembly 60 may propel the cover 16 by means of mechanical, pneumatic, electromechanical, or pyrotechnic or alternative gas generating systems. A non-limiting example of such a mechanism is a spring 66.

FIG. 13 illustrates an expandable pouch-shaped active hood front cover 62 in its stowed position with respect to a hood front cover housing 64. FIG. 14 illustrates the expandable, pouch-shaped active hood front cover 62 in a deployed position with respect to a hood front cover housing 64 above fascia 16. The expandable front cover can provide two levels of compliance. For example, a first energy absorption characteristic is provided when deforming the cover 62 as it bends towards fascia 16. A second energy absorption characteristic can be provided as the expanded portion of cover 62 collapses upon itself when impacted by a pedestrian. Further, the expansion of the pouch-like shape can enable earlier contact with the pedestrian, reducing body segment displacement speed.

Thus the disclosed invention as set forth above overcomes various challenges associated with known pedestrian protection systems for vehicles in a number of ways, offering an uncomplicated supplemental performance enhancement capability or a potential alternative to such pedestrian protection systems as hood airbags. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A pedestrian protection apparatus for a motor vehicle having a hood, the hood having an edge and an underside adjacent the edge, the apparatus comprising:
   a hood cover operatively associated with the underside of the edge, said cover being movable between stowed and deployed positions; and
   a mechanism for moving said cover between said stowed and deployed positions, said mechanism including a spring assembly having a spring and a housing.

2. The pedestrian protection apparatus of claim 1 further including a hood cover housing to which said hood cover is attached, said hood cover housing being attached to the underside of the edge of the hood.

3. The pedestrian protection apparatus of claim 1 wherein said hood cover is composed of a material selected from the group consisting of a rigid material and a partially deformable material.

4. The pedestrian protection apparatus of claim 1 wherein said hood cover includes an expandable and deformable hollow portion.

5. The pedestrian protection apparatus of claim 1 wherein an interface is provided between said hood cover housing and the underside of said hood, said interface being deformable in a controlled manner to provide energy absorption upon being loaded as a result of a pedestrian impact with said hood cover in its deployed position.

6. The pedestrian protection apparatus of claim 1 wherein said mechanism for moving said cover between said stowed position and said deployed position is selected from the group consisting of a pneumatic actuator, an electric motor, a pyrotechnic inflator, and a gas generating device.

7. The pedestrian protection apparatus of claim 1 further including a sensing system, said sensing system selected from the group consisting of an impact predicting sensing system and an impact detection sensing system.

8. A pedestrian protection apparatus for a motor vehicle having a hood, the hood having an edge and an underside adjacent the edge, the apparatus comprising:
   a hood cover assembly including a cover and a cover housing, said housing being attached to the underside area adjacent said edge, said cover being movable between stowed and deployed positions;
   a mechanism for moving said cover between said positions; and
   an interface between said cover housing and the underside of said hood, said interface being deformable in a controlled manner to provide energy absorption upon being loaded as a result of a pedestrian impact with said cover in said deployed position.

9. The pedestrian protection apparatus of claim 8 wherein said cover is composed of a material selected from the group consisting of a rigid material and a partially deformable material.

10. The pedestrian protection apparatus of claim 8 wherein said cover includes a flexible and hollow portion.

11. The pedestrian protection apparatus of claim 8 wherein said mechanism for moving said cover between said stowed and deployed positions includes a spring assembly, and wherein said spring assembly includes a spring and a housing.

12. The pedestrian protection apparatus of claim 8 wherein said mechanism for moving said cover between said stowed position and said deployed position is selected from the group consisting of a pneumatic actuator, an electric motor, a pyrotechnic inflator, and a gas generating device.

13. The pedestrian protection apparatus of claim 8 further including a sensing system, said sensing system selected from the group consisting of an impact predicting sensing system and an impact detection sensing system.

14. A pedestrian protection apparatus for a vehicle having a hood, the apparatus comprising:
   a hood cover assembly including an enclosure operatively associated with the hood and a cover movable between stowed and deployed positions;
   a control system for deploying said cover, said control system having a sensor selected from the group consisting of an impact predicting sensor and an impact detecting sensor; and
   a mechanism associated with said cover assembly for moving said cover; and
   an interface between said housing and the underside of said hood, said interface being deformable in a controlled manner to provide energy absorption upon being loaded as a result of a pedestrian impact with said cover in said deployed position.

15. The pedestrian protection apparatus of claim 14 wherein said hood cover is composed of a material selected from the group consisting of a rigid material and a partially deformable material.

16. The pedestrian protection apparatus of claim 14 wherein said hood cover includes a deformable and expandable hollow portion.

17. The pedestrian protection apparatus of claim 14 wherein said mechanism for moving said cover between said stowed position and said deployed position, is elected from the group consisting of a pneumatic actuator, an electric motor, a pyrotechnic inflator, a gas generating device, and a spring and housing assembly.

* * * * *